(12) United States Patent
Kishima

(10) Patent No.: US 7,382,980 B2
(45) Date of Patent: *Jun. 3, 2008

(54) OPTICAL COMMUNICATION APPARATUS, OPTICAL COMMUNICATION INFORMATION DECODING METHOD, OPTICAL SWITCHING SYSTEM, AND DRIVING METHOD FOR OPTICAL SWITCHING SYSTEM

(75) Inventor: Koichiro Kishima, Kanagawa (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/434,119

(22) Filed: May 16, 2006

(65) Prior Publication Data

US 2006/0245760 A1 Nov. 2, 2006

Related U.S. Application Data

(63) Continuation of application No. 10/198,130, filed on Jul. 19, 2002, now Pat. No. 7,092,632.

(30) Foreign Application Priority Data

Jul. 24, 2001 (JP) .............................. P2001-223056

(51) Int. Cl.
H04J 14/00 (2006.01)

(52) U.S. Cl. ...................................................... 398/51

(58) Field of Classification Search .................. 398/51, 398/54, 212
See application file for complete search history.

(56) References Cited

U.S. PATENT DOCUMENTS

| 5,488,501 A | 1/1996 | Barnsley |
| 5,680,247 A | 10/1997 | Okuno |
| 6,023,360 A | 2/2000 | Morioka et al. |
| 6,667,995 B2 | 12/2003 | Geng et al. |
| 6,810,211 B1 | 10/2004 | Castanon |

(Continued)

FOREIGN PATENT DOCUMENTS

EP 0697775 A2 2/1996

(Continued)

OTHER PUBLICATIONS

EPO International Search Report Oct. 24, 2002.

(Continued)

*Primary Examiner*—Shi K Li
(74) *Attorney, Agent, or Firm*—Rader Fishman & Grauer PLLC; Ronald P. Kananen

(57) ABSTRACT

An optical switching system is disclosed which can achieve high-speed optical switching with a simple configuration. Light from a light irradiation section is irradiated into an optical transmission line made of a material having a non-linear optical effect and disposed on the upstream side with respect to an optical switch provided for performing switching of a transmission line to cause the non-linear optical effect to occur. Thereupon, light is emitted externally from the optical transmission line by the non-linear optical effect between the light irradiated by the light irradiation section and light propagating in the optical transmission line. The light emitted is received by a light reception section to acquire intensity information of the light propagating in the optical transmission line. The intensity information is used as a driving signal for driving the optical switch.

20 Claims, 7 Drawing Sheets

U.S. PATENT DOCUMENTS 6,819,807 B2 * 11/2004 Garner et al. .................. 385/1
7,177,544 B1 * 2/2007 Wada et al. .................. 398/51
2003/0021027 A1 1/2003 Kishima

FOREIGN PATENT DOCUMENTS

| WO | WO 98/31184 | 7/1998 |
| WO | WO 00/04668 | 1/2000 |
| WO | WO 02/46837 | 6/2002 |

OTHER PUBLICATIONS

T. Ulmer et al. "160-Gb/s Optically Time-Division Multiplexed Link with All-Optical Demultiplexing", Journal of Lightwave Technology, vol. 18, No. 12, Dec. 2000.

* cited by examiner

OPTICAL COMMUNICATION APPARATUS, OPTICAL COMMUNICATION INFORMATION DECODING METHOD, OPTICAL SWITCHING SYSTEM, AND DRIVING METHOD FOR OPTICAL SWITCHING SYSTEM

CROSS REFERENCE TO RELATED APPLICATIONS

This application is a continuation of U.S. application Ser. No. 10/198,130, filed on Jul. 19, 2002 now U.S. Pat. No. 7,092,632, which claims priority under 35 USC § 119 of App. No. P2001-223056 filed in Japan on Jul. 24, 2001. These applications are hereby incorporated by reference in their entirety.

BACKGROUND OF THE INVENTION

This invention relates to an optical communication apparatus, an optical communication information decoding method, an optical switching system and a driving method for an optical switching system and, more particularly, to an optical communication apparatus, an optical communication information decoding method, an optical switching system and a driving method for an optical switching system suitable for use for a switching process of multiplexed optical signals.

The field of optical communication has been developing rapidly together with the progress of the information-based society in recent years. In the field of optical communication, the progress is significant in the field of enhancement in function, beginning with the enhancement in transfer rate and the multiplexing of data.

As a multiplexing technique, wavelength multiplexing techniques, such as the WDM (Wavelength Division Multiplexing) and the DWDM (Dense Wavelength Division Multiplexing), have been developed.

In such a situation as described above, also with regard to a switching technique required for a repeating point of an optical fiber transmission line (hereinafter referred to merely as optical fiber), specifications for higher performances, such as a higher speed operation of an optical switch, are demanded.

More particularly, it is demanded to raise the speed of an optical switch, which quickly decodes header information included in information propagating in an optical fiber, that is, information in which a destination of information is recorded, and operates rapidly in response to the header information.

However, in the environment of the WDM or the DWDM, information propagating in an optical fiber and including header information cannot be read before optical wavelengths are demultiplexed from one another. Therefore, an optical switching system at a repeating point of an optical fiber cannot avoid having a configuration as shown in FIG. 1.

FIG. 1 shows an optical switching system which distributes and outputs wavelength-multiplexed optical signals inputted from an optical fiber 51 to optical fibers 52 and 53 in accordance with header information of the wavelength-multiplexed optical signals.

Referring to FIG. 1, wavelength-multiplexed light transmitted along the optical fiber 51 in accordance with the WDM or DWDM system is demultiplexed for individual wavelengths by a demultiplexer 54 and individually received by light reception units 55a to 55f. Information reading apparatus 56a to 56f read header information of information signals in the form of optical signals of the different wavelengths received by the light reception units 55a to 55f, respectively.

The information reading apparatuses 56a to 56f discriminate destinations of the individual information signals based on the header information to select output destinations of the information signals and signal the information signals to light emitting elements 57a to 57f or light emitting elements 58a to 58f.

For example, if the information reading apparatus 56a discriminates that the output destination of the pertaining information signal is the optical fiber 52 side, then it outputs the information signal to the light emitting element 57a. On the other hand, if the information reading apparatus 56a discriminates that the information signal is the optical fiber 53 side, then it outputs the information signal to the light emitting element 58a.

When each of the light emitting elements 57a to 57f and the light emitting elements 58a to 58f receives an information signal, it emits light of an optical signal of a predetermined wavelength corresponding to the information signal.

Optical signals of different wavelengths outputted from all or some of the light emitting elements 57a to 57f are multiplexed in accordance with the WDM or DWDM system by a multiplexer 59 and signaled to the optical fiber 52. On the other hand, optical signals of different wavelengths outputted from all or some of the light emitting elements 58a to 58f are multiplexed in accordance with the WDM or DWDM system by a multiplexer 60 and signaled to the optical fiber 53.

In this manner, at a repeating point of an optical fiber, a demultiplexer for demultiplexing wavelength-multiplexed light into different wavelengths used in the WDM or DWDM, light receiving elements for the individual wavelengths and a number of light emitting sources for the individual wavelengths equal to the number of fiber transmission lines used for transmission are required. Therefore, the optical switching system has a configuration of a great scale.

Further, since the optical switching system is configured such that it uses a procedure including demultiplexing of multiplexed wavelengths, light reception and information reading in order to select transmission destinations; it is limited to satisfaction of the demand for high speed optical switching.

SUMMARY OF THE INVENTION

It is an object of the present invention to provide a method and an apparatus which can decode information included in optical signals transmitted, for example, in accordance with the WDM or DWDM system without de-multiplexing the optical signals.

It is another object of the present invention to provide an optical switching system and a driving method for an optical switching system which can achieve high speed optical switching with a simple configuration.

In order to attain the objects described above, according to the first aspect of the present invention, there is provided an optical communication apparatus which includes an optical transmission line made of a material having a non-linear optical effect, a light irradiation section for irradiating light into the optical transmission line to cause the non-linear optical effect to occur, and a light reception section for receiving light emitted externally from the optical transmission line by the non-linear optical effect between the light irradiated into the optical transmission line by the light irradiation section and light propagating in the optical transmission line to acquire intensity information of the light propagating in the optical transmission line.

According to the second aspect of the present invention, there is provided an optical communication information decoding method for an optical communication apparatus which includes an optical transmission line made of a material having a non-linear optical effect, a light irradiation section for irradiating light into the optical transmission line to cause the non-linear optical effect to occur, and a light reception section for receiving light emitted externally from the optical transmission line by the non-linear optical effect of the optical transmission line, including the step of receiving the light emitted externally from the optical transmission line by the non-linear optical effect between the light irradiated into the optical transmission line by the light irradiation section and light propagating in the optical transmission line by means of the light reception section to decode header information of the information propagating in the optical transmission line.

According to the third aspect of the present invention, there is provided an optical switching system for switching a transmission line in response to information propagating in an optical transmission line which includes an optical switch for performing switching of the transmission line, an optical transmission line made of a material having a non-linear optical effect and disposed on the upstream side with respect to the optical switch, a light irradiation section for irradiating light into the optical transmission line to cause the non-linear optical effect to occur, a light reception section for receiving light emitted externally from the optical transmission line by the non-linear optical effect between the light irradiated into the optical transmission line by the light irradiation section and light propagating in the optical transmission line to acquire intensity information of the light propagating in the optical transmission line, and driving means for producing a driving signal for the optical switch from the intensity information acquired by the light reception section.

According to the fourth aspect of the present invention, there is provided a driving method for an optical switching system for switching a transmission line in response to information propagating in an optical transmission line, including the steps of irradiating light from a light irradiation section into an optical transmission line made of a material having a non-linear optical effect and disposed on the upstream side with respect to an optical switch which performs switching of a transmission line, receiving light emitted externally from the optical transmission line by the non-linear optical effect between the light irradiated by the light irradiation section and light propagating in the optical transmission line by means of a light reception section to acquire intensity information of the light propagating in the optical transmission line, and producing a driving signal for the optical switch based on the intensity information.

In the optical communication apparatus, optical communication information decoding method, optical switching system and driving method for an optical switching system, the light emitted externally from the optical transmission line by the non-linear optical effect may have a wavelength different from that of the light propagating in the optical transmission line.

Where the light propagating in the optical transmission line has a plurality of wavelengths, the light emitted externally from the optical transmission line by the non-linear optical effect may have a plurality of wavelengths corresponding to the plurality of wavelengths propagating in the optical transmission line.

Where the light propagating in the optical transmission line has a plurality of wavelengths, the light emitted externally from the optical transmission line by the non-linear optical effect may be emitted in a plurality of directions corresponding to the plurality of wavelengths propagating in the optical transmission line.

Preferably, the light irradiated into the optical transmission line by the light irradiation section to cause the non-linear optical effect to occur is a laser beam.

The light irradiation section may include a resonator in which an optical transmission line made of a material having a non-linear optical effect is disposed.

With the optical communication apparatus, optical communication information decoding method, optical switching system and driving method for an optical switching system, for example, where optical signals multiplexed with different wavelengths in accordance with the WDM system or the DWDM system are transmitted, information included in the optical signals can be decoded at a stage before they are demultiplexed from each other through the utilization of a non-linear optical effect in the optical transmission line, and a switching operation for optical switching can be performed in response to the decoded information. Consequently, there is the advantage that a temporal intensity variation of the light propagating in the optical transmission line can be decoded for each of the wavelengths of the light signals before the light is demultiplexed.

Further, even in an environment of a system wherein different wavelengths are involved, such as the WDM system or the DWDM system, information of each wavelength, specifically header information, can be decoded without using a demultiplexer. Therefore, the processing time when an optical switch is driven can be reduced.

Furthermore, the optical switching system can be formed in a simplified configuration because there is no necessity to prepare light emitting elements (light sources) for individually different wavelengths.

The above and other objects, features and advantages of the present invention will become apparent from the following description and the appended claims taken in conjunction with the accompanying drawings in which like parts or elements are denoted by like reference symbols.

DESCRIPTION OF THE PREFERRED EMBODIMENT

Figure 2:
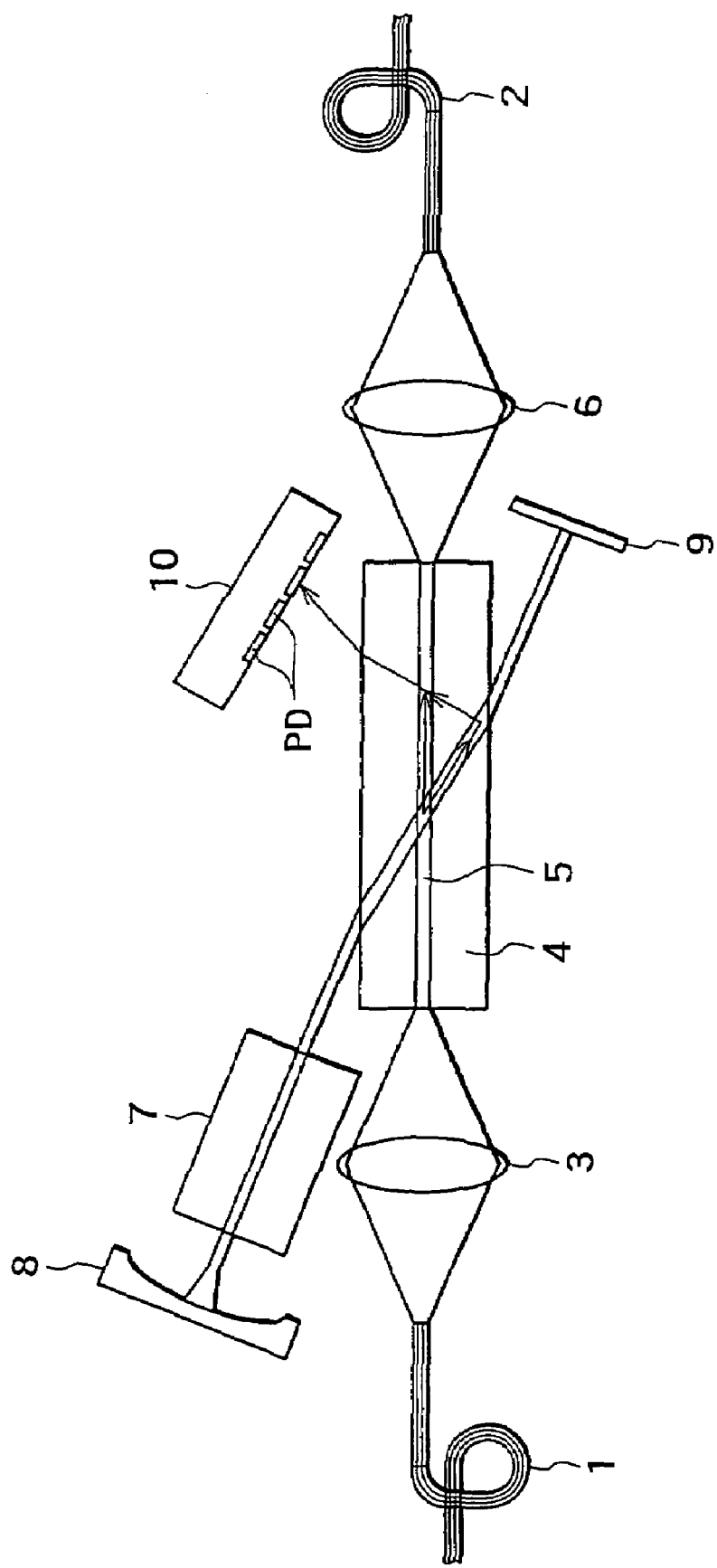
FIG. 2 is a schematic view showing a configuration of an optical communication apparatus to which the present invention is applied.

Referring to FIG. 2, there is shown an optical communication apparatus to which the present invention is applied. The optical communication apparatus shown is formed as a repeating apparatus for supplying propagation light having communication information and transmitted thereto from an optical fiber 1 to another optical fiber 2.

The propagation light here is a light wavelength multiplexed, for example, in accordance with the WDM or DWDM system.

The optical communication apparatus of the first embodiment includes a lens 3, a non-linear, optical crystal member 4 in which an optical waveguide 5 is formed, another lens 6, a YAG laser lot 7, mirrors 8 and 9, and a PD (photo-detector) array 10.

Propagation light having communication information propagates along the optical waveguide 5 (for example, an optical waveguide element made of a lithium niobate material) formed by the non-linear optical material 4 in a transmission line, more particularly, between the optical fibers 1 and 2.

The optical parts (YAG laser lot 7 and the mirrors 8 and 9) for irradiating a high-intensity laser beam from the outside of the optical waveguide 5 are arranged for the optical waveguide 5.

The optical parts and the optical waveguide 5 are arranged such that an interaction between the propagation light having the communication information propagates in the optical waveguide 5. The laser beam irradiated from the outside of the optical waveguide 5 by the YAG laser lot 7 and the mirrors 8 and 9 occurs such that light having wavelengths different from those of the propagation light having the communication information which propagates in the optical waveguide 5 is emitted to the outside of the optical waveguide 5.

The PD array 10 is arranged outside the optical waveguide 5 and includes light receiving elements (photodetectors) PD for converting the light emitted to the outside of the optical waveguide 5 into electric signals.

Figure 3:
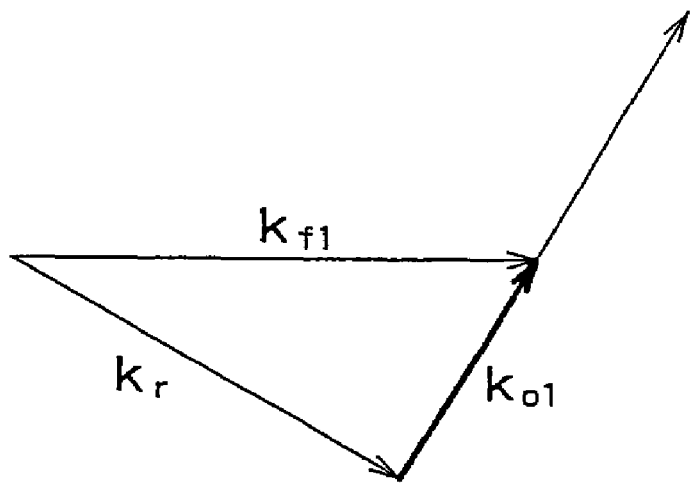
FIGS. 3 and 4 are wave number vector diagrams where the frequency difference of a parametric oscillation phenomenon is used in the optical communication apparatus of FIG. 2.

Here, the interaction between the propagation light having communication information which propagates in the optical waveguide 5 and the laser beam irradiated particularly from the outside is a phenomenon such as parametric oscillation based on a non-linear optical constant of the non-linear optical material 4. As seen in FIG. 3, the interaction is an action wherein light is emitted with a wavelength and in a direction which satisfy a wave number vector Ko1 which depends upon the wave number vector Kf1 of the light which propagates in the transmission line and the wave number vector Kr of the light irradiated from the outside.

It is to be noted that the parametric oscillation phenomenon includes the two phenomena of a frequency difference and a frequency sum. FIG. 3 illustrates the relationship of vectors where the phenomenon of frequency difference is used.

The parametric oscillation phenomenon is a phenomenon wherein light of a wave number vector determined by the wave number vector of light which propagates in the transmission line and the wave number vector of light irradiated from the outside is emitted externally. Therefore, even if the light irradiated from the outside has a single frequency, if another light having a different wavelength propagates in the transmission line, then the light is emitted externally with a wavelength and in a direction which satisfy a wave number vector Ko2 which depends upon the wave number vector Kf2 of the light which propagates in the transmission line and the wave number vector Kr of the light irradiated from the outside as seen from the wave number vector diagram of FIG. 4. Consequently, lights having wavelengths different from each other are emitted externally in directions corresponding to the wavelengths of the lights which propagate in the transmission line.

Further, if the light irradiated from the outside is light fixed in time, then the externally emitted light includes a temporal intensity distribution corresponding to the temporal intensity variation of the light propagating in the transmission line.

Figure 4:
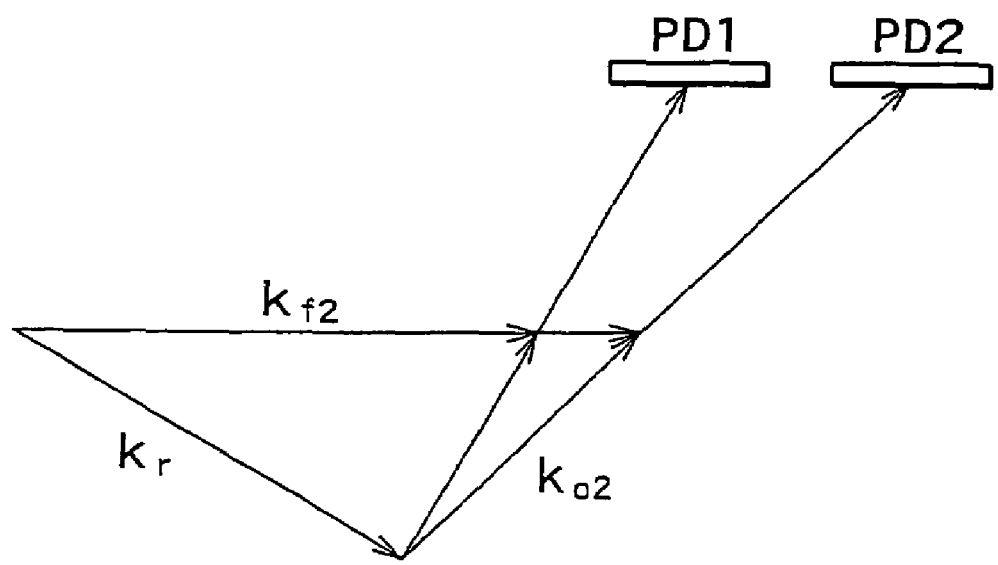

In particular, temporal intensity variations for the individual wavelengths of the propagation lights which propagate in the transmission line, that is, signals corresponding to communication information, are inputted to the two light receiving elements PD1 and PD2 seen in FIG. 4.

Then, even if the lights which propagate in the transmission line are weak, if the light irradiated from the outside has a high intensity and there is a situation where the light which transmits in the transmission line is confined in the transmission line, then the light receiving elements PD1 and PD2 can read the optical information.

If the action described above is adapted to the configuration of FIG. 2, then the transmission line shown in FIGS. 3 and 4 corresponds to the optical waveguide 5, and propagation light having communication information is confined in the optical waveguide 5. Then, a laser beam having a high intensity is irradiated from the YAG laser lot 7 upon the optical waveguide 5. In this instance, the irradiated laser beam does not propagate in the optical waveguide 5, and therefore, is not condensed by the lens 6 and does not propagate to the optical fiber 2.

Accordingly, temporal intensity variations of the individual wavelengths included in the propagation light which propagates in the optical waveguide 5, that is, signals corresponding to the individual multiplexed communication information, are inputted to a plurality of light receiving elements PD in the PD array 10.

Figure 1:
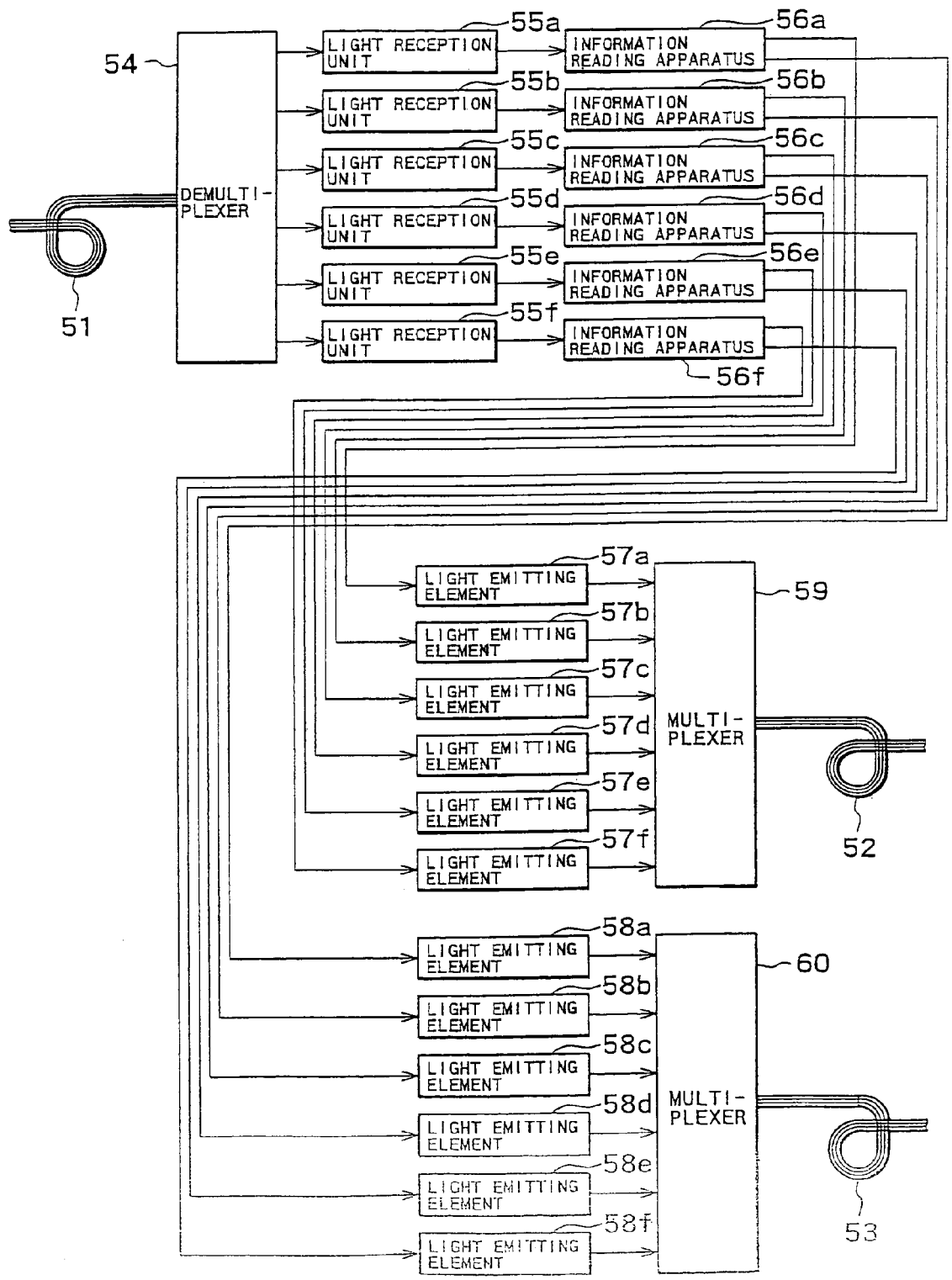
FIG. 1 is a block diagram showing a configuration of a conventional, optical switching system.

The optical communication apparatus of FIG. 1 can read several kinds of information multiplexed with different wavelengths without demultiplexing the multiplexed information.

Figure 5:
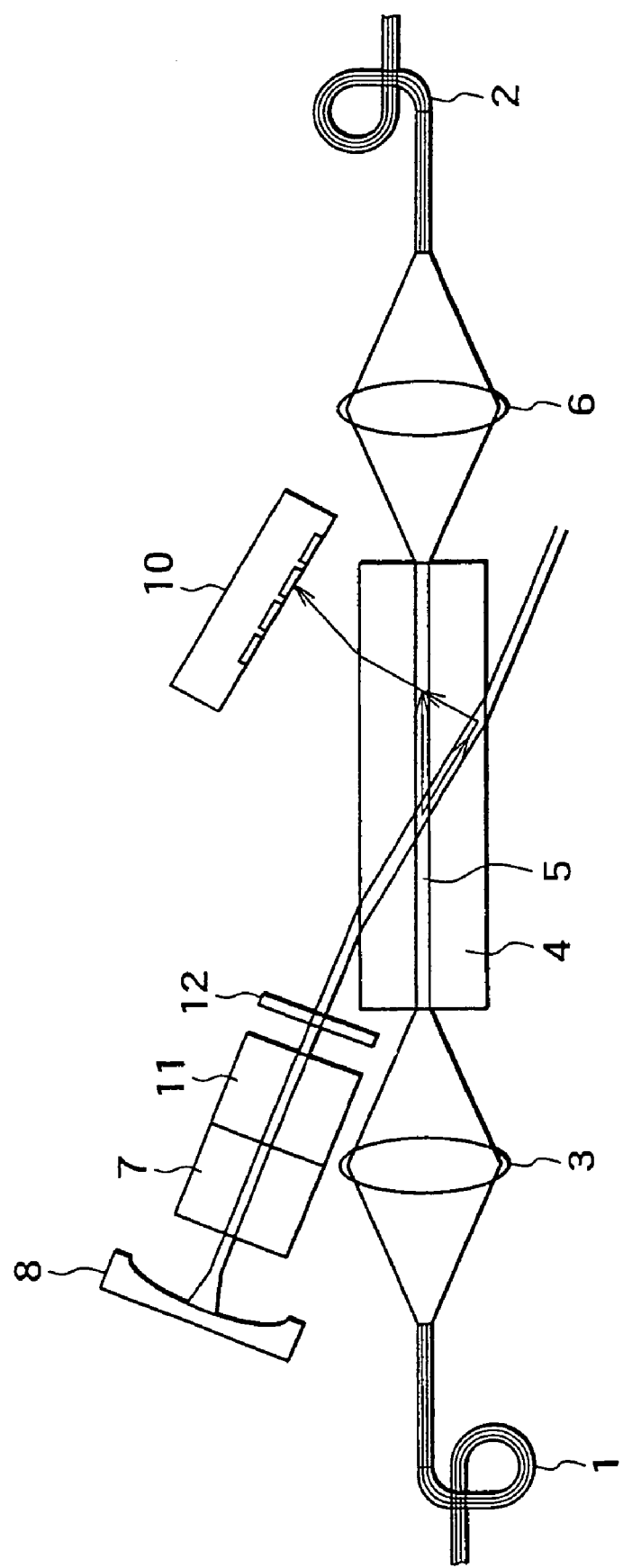
FIG. 5 is a schematic view showing a configuration of another optical communication apparatus to which the present invention is applied.

A configuration of another optical communication apparatus to which the present invention is supplied is shown in FIG. 5. Referring to FIG. 5, the optical communication apparatus has a resonator configuration provided at a location at which a light irradiation section which irradiates light upon the optical waveguide 5 is provided, and an optical transmission line formed from a material having a non-linear optical effect is arranged in the resonator.

It is to be noted that the optical communication apparatus of FIG. 5 further includes lenses 3 and 6, an optical waveguide 5 and a PD array 10 similar to those of the optical communication apparatus described hereinabove with reference to FIG. 2.

In the optical communication apparatus of FIG. 5, a YAG laser lot 7, a non-linear optical crystal member 11, and mirrors 8 and 12 are provided as components of the light irradiation section which irradiates a laser beam from the outside upon the optical waveguide 5. The non-linear optical crystal 11 arranged for the YAG laser lot 7 functions as a second harmonic production element.

In particular, in the optical communication apparatus of FIG. 5, the non-linear, optical crystal element 11, which is a second harmonic production element, is used to reduce the wavelength of the laser beam. If the wavelength of the laser beam is reduced by the reduction of the wavelength just described to convert the laser beam into a laser beam of a wavelength shorter than, for example, 1.064 microns, that is, of a higher frequency, a higher conversion efficiency can be achieved.

Figure 6:
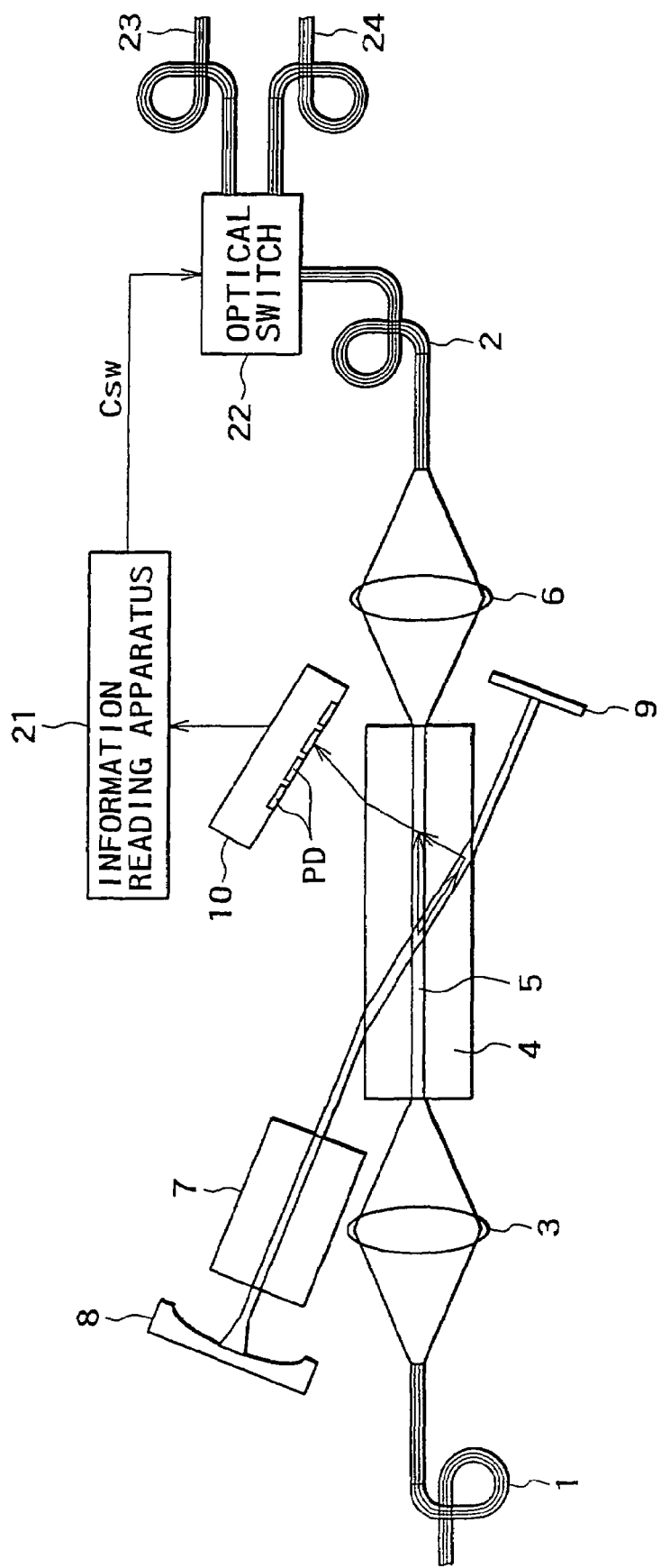
FIG. 6 is a schematic view showing a configuration of an optical switching system to which the present invention is applied.

FIG. 6 shows an optical communication system to which the present invention is applied. The optical communication system shown uses the optical information reading method of the optical communication apparatus shown in FIG. 2.

Referring to FIG. 6, the optical communication system uses the optical communication apparatus of FIG. 2 and includes an optical switch 22 connected to the optical fiber 2 shown in FIG. 2 for distributing light from the optical fiber 2 to an optical fiber 23 and another optical fiber 24 and an information reading apparatus 21 for supplying a switching driving signal CSW to the optical switch 22 to drive the optical switch 22.

It is to be noted that, although a particular configuration of the optical switch 22 is not shown in FIG. 6, a known optical switch such as an optical switch composed of a demultiplexer, a micro-mirror array and a multiplexer may be used as the optical switch 22.

In the optical communication system shown in FIG. 6, a decoding operation of optical information is performed at a stage before signal light is introduced into the optical switch 22, that is, at a stage wherein signal light is propagating in the optical waveguide 5 of the non-linear optical crystal 4 before it is introduced into the optical fiber 2.

In particular, since, as described hereinabove in connection with the optical communication apparatus of FIG. 2, intensity information of optical signals of different wavelengths which propagate in the optical waveguide 5 is inputted individually to the light receiving elements of the PD array 10, the information reading apparatus 21 can decode the signals obtained by the light receiving elements of the PD array 10 to read information of the multiplexed optical signals such as, for example, header information.

Accordingly, the information reading apparatus 21 can discriminate output destinations of the optical signals of different wavelengths and produce a driving signal CSW for the optical switch 22 in accordance with the output destinations.

Since, in the optical switching system having such a configuration as described above, decoding of optical information of optical signals of signal light is performed at a stage before the optical signals are inputted to the optical switch 22, the decoding information operation is performed at an earlier stage when compared with an alternative case wherein the optical signals are demultiplexed to read the optical information after they have propagated in the optical fiber 2. Accordingly, driving the optical switch 22 can be performed at an earlier stage. In other words, higher speed optical switching can be achieved.

Further, in the optical switching system shown in FIG. 6, the necessity for preparation of a light source for each wavelength is eliminated when compared with the conventional optical switching system shown in FIG. 1. Therefore, the optical communication system can be formed with a reduced size and at a reduced cost.

Figure 7:
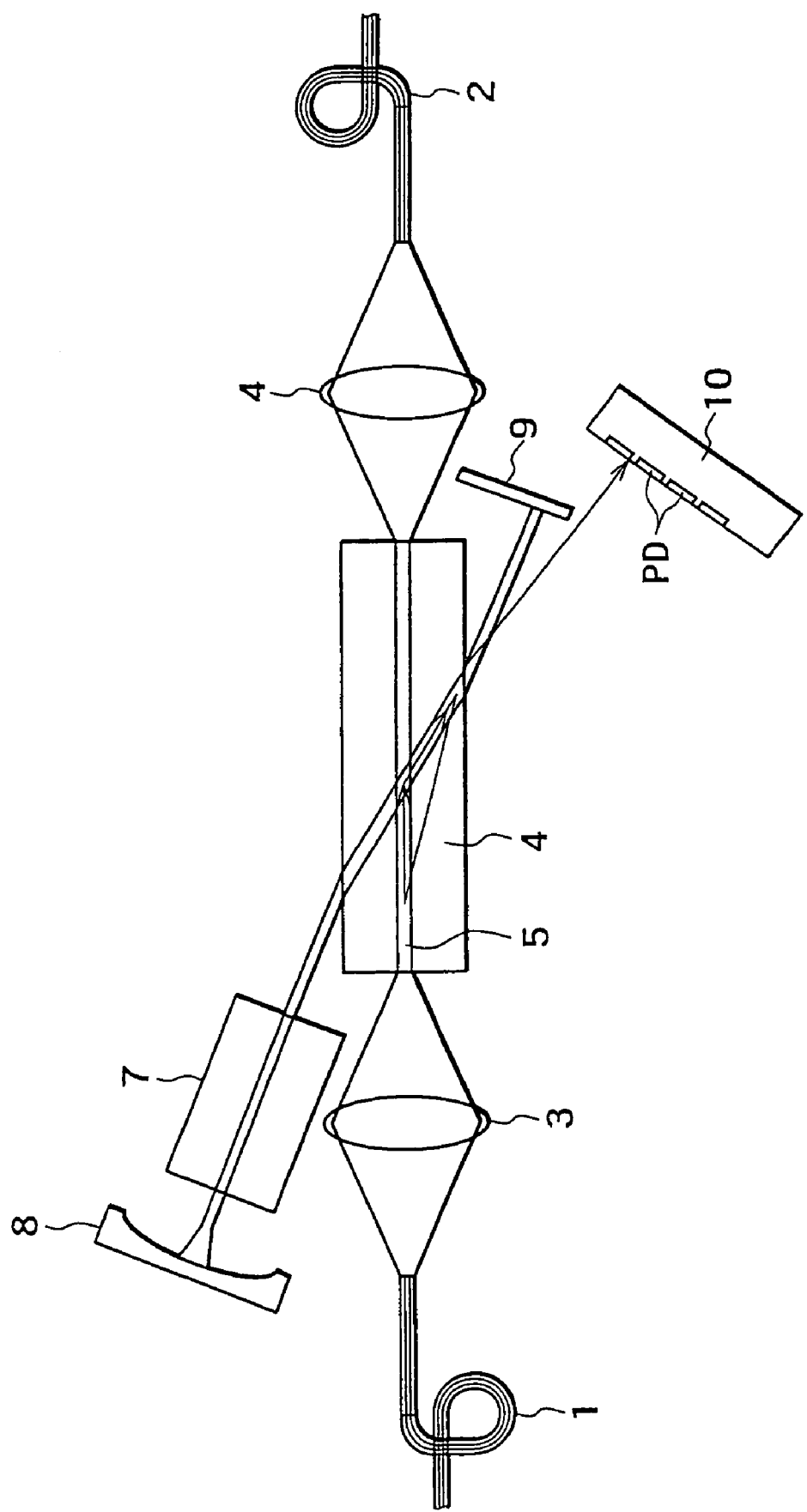
FIG. 7 is a schematic view showing a configuration of a further optical communication apparatus to which the present invention is applied.
Figure 8:
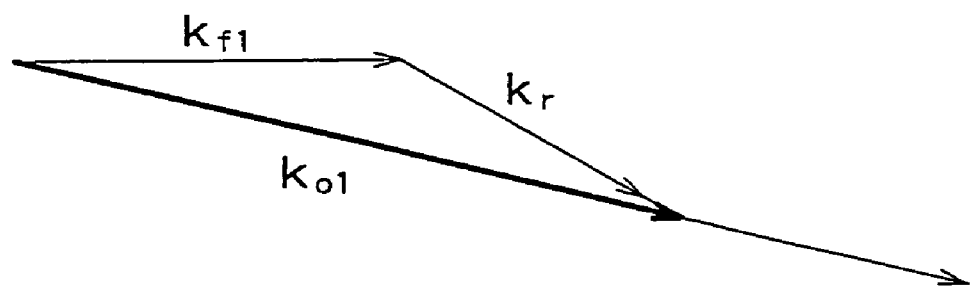
FIGS. 8 and 9 are wave number vector diagrams where the frequency difference of a parametric oscillation phenomenon is used in the optical communication apparatus of FIG. 7.
Figure 9:
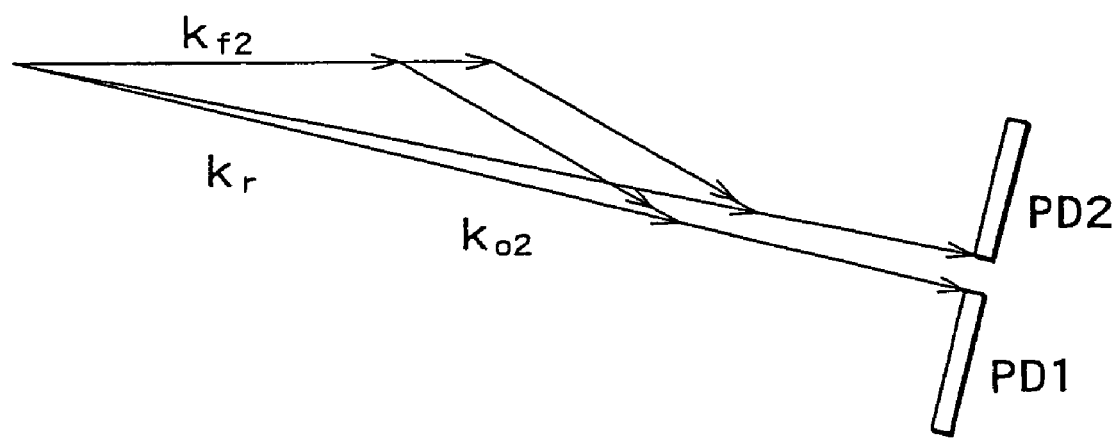

It is to be noted that, while it is described that the frequency difference of the parametric oscillation phenomenon is used in the optical communication apparatus and the optical switching system according to the present invention described above, the present invention is not limited to such optical communication apparatus or optical switching system in which such a frequency difference is used. FIG. 7 shows a further optical communication apparatus to which the present invention is applied. Referring to FIG. 7, the optical communication apparatus shown uses the frequency sum of the parametric oscillation phenomenon. The optical communication apparatus includes similar components to those of the optical communication apparatus described hereinabove with reference to FIGS. 2 and 5. FIGS. 8 and 9 illustrate wave number vectors of the optical communication apparatus of FIG. 7.

Also the optical communication apparatus of FIG. 7 externally emits light with a wavelength and in a direction which satisfy a wave number vector Ko1 which depends upon the wave number vector Kf1 of light propagating in the transmission line and the wave number vector Kr of light irradiated from the outside, as seen in FIG. 8.

Further, even if the light irradiated from the outside has a single frequency, if another light having a different wavelength propagates in the transmission line, then the light is emitted externally with a wavelength and in a direction which satisfy a wave number vector Ko2 which depends upon the wave number vector Kf2 of the light which propagates in the transmission line and the wave number vector Kr of the light irradiated from the outside as seen from the wave number vector diagram of FIG. 8. Consequently, lights having wavelengths different from each other are emitted externally in directions corresponding to the wavelengths of the lights which propagate in the transmission line.

From FIGS. 8 and 9, it can be recognized that, even where the frequency sum of the parametric oscillation phenomenon is used, by irradiating a laser beam having a single frequency and fixed in time from the outside, a temporal intensity variation for each wavelength propagating in a transmission line can be detected by means of light receiving elements that are provided externally to monitor lights emitted externally with wavelengths and in directions different among different wavelengths from an optical waveguide element made of a non-linear optical material.

Accordingly, the optical communication apparatus having the configuration described above with reference to FIG. 7 also can read information of individual wavelengths from multiplexed optical signals propagating in the optical waveguide 5 by means of the light receiving elements PD of the PD array 10. Naturally, the optical communication apparatus of FIG. 7 can be used to construct the optical switching system described hereinabove with reference to FIG. 6.

In the following, examples of the wavelength and the direction of externally emitted light with respect to the wavelength and the incident angle of incident light are described with regard to two cases, including the case wherein the frequency difference of a parametric oscillation phenomenon is used and another case wherein a frequency sum of the parameter oscillation phenomenon is used.

<Where a frequency difference is used>

(1)-1

Wavelength propagating in optical transmission line: 1.550 microns

Wavelength of irradiated light: 1.064 microns

Incident angle: 10 degrees

Wavelength of externally emitted light: 3.08218 microns

Emitting angle: 3.43666 degrees (1)-2
Wavelength propagating in optical transmission line: 1.552 microns
Wavelength of irradiated light: 1.064 microns
Incident angle: 10 degrees
Wavelength of externally emitted light: 3.07537 microns
Emitting angle: 3.444429 degrees
Position difference corresponding to wavelength difference 2 nm of propagating light where light receiving element is disposed at position spaced rearwardly by 10 mm from optical waveguide element: 369 microns (2)-1
Wavelength propagating in optical transmission line: 1.550 microns
Wavelength of irradiated light: 0.532 microns
Incident angle: 10 degrees
Wavelength of emitting light: 0.800402 microns
Emitting angle: 6.62774 degrees (2)-2
Wavelength propagating in optical transmission line: 1.552 microns
Wavelength of irradiated light: 0.532 microns
Incident angle: 10 degrees
Wavelength of emitting light: 0.799888 microns
Emitting angle: 6.63201 degrees
Position difference corresponding to wavelength difference 2 nm of propagating light where light receiving element is disposed at position spaced rearwardly by 10 mm from optical waveguide element: 56 microns <Where a frequency sum is used>

(3)-1
Wavelength propagating in optical transmission line: 1.550 microns
Wavelength of irradiated light: 1.064 microns
Incident angle: 10 degrees
Wavelength of emitting light: 0.633237 microns
Emitting angle: 16.96416 degrees (3)-2
Wavelength propagating in optical transmission line: 1.552 microns
Wavelength of irradiated light: 1.064 microns
Incident angle: 10 degrees
Wavelength of externally emitted light: 0.633568 microns
Emitting angle: 16.95501 degrees
Position difference corresponding to wavelength difference 2 nm of propagating light where light receiving element is disposed at position spaced rearwardly by 10 mm from optical waveguide element: 188 microns (4)-1
Wavelength propagating in optical transmission line: 1.550 microns
Wavelength of irradiated light: 0.532 microns
Incident angle: 10 degrees
Wavelength of externally emitted light: 0.397211 microns
Emitting angle: 13.4486 degrees (4)-2
Wavelength propagating in optical transmission line: 1.552 microns
Wavelength of irradiated light: 0.532 microns
Incident angle: 10 degrees
Wavelength of externally emitted light: 0.397341 microns
Emitting angle: 13.4441 degrees
Position difference corresponding to wavelength difference 2 nm of propagating light where light receiving element is disposed at position spaced rearwardly by 10 mm from optical waveguide element: 144 microns According to the accuracy in production of light receiving elements at present, it is easy to produce light receiving elements of the size of approximately 10 microns. Therefore, from the results of the calculation above, it can be seen that a sufficient resolution in position for wavelengths propagating in the optical waveguide 5 is obtained. In other words, information propagating in the optical waveguide 5 can be read for each of wavelengths of the light as described hereinabove in connection with the embodiments of the present invention.

While preferred embodiments of the present invention have been described using specific terms, such description is for illustrative purposes only, and it is to be understood that changes and variations may be made without departing from the spirit or scope of the following claims.

The invention claimed is:

1. An optical communication apparatus, comprising:
an optical transmission line made of a material having a non-linear optical effect;
a light irradiation section for irradiating light into said optical transmission line, wherein light propagating in said optical transmission line is in a first direction and the irradiating light is in a second direction that differs from the first direction and that is at an incident angle to the light propagating in said optical transmission line to cause the non-linear optical effect to occur; and
a light reception section for receiving light emitted externally from said optical transmission line by the non-linear optical effect between the light irradiated into said optical transmission line by said light irradiation section and the light propagating in said optical transmission line to acquire intensity information of the light propagating in said optical transmission line, wherein the light emitted externally from said optical transmission line by the non-linear effect is in a third direction that differs from the first direction and that is at an emitting angle to the light propagating in said optical transmission line, and wherein the emitting angle depends upon characteristics of the light propagating in said optical transmission line and is less than ninety degrees,
wherein the light propagating in said optical transmission line has a plurality of wavelengths, and the light emitted externally from said optical transmission line by the non-linear optical effect has a plurality of wavelengths corresponding to the plurality of wavelengths propagating in said optical transmission line.

2. An optical communication apparatus according to claim 1, wherein the light emitted externally from said optical transmission line by the non-linear optical effect has a wavelength different from that of the light propagating in said optical transmission line.

3. An optical communication apparatus according to claim 1, wherein the light irradiated into said optical transmission line by said light irradiation section to cause the non-linear optical effect to occur is a laser beam.

4. An optical communication apparatus according to claim 1, wherein said light irradiation section includes a resonator in which an optical transmission line made of a material having a non-linear optical effect is disposed.

5. An optical communication apparatus, comprising:
an optical transmission line made of a material having a non-linear optical effect;
a light irradiation section for irradiating light into said optical transmission line, wherein light propagating in said optical transmission line is in a first direction and the irradiating light is in a second direction that differs from the first direction and that is at an incident angle to the light propagating in said optical transmission line to cause the non-linear optical effect to occur; and a light reception section for receiving light emitted externally from said optical transmission line by the non-linear optical effect between the light irradiated into said optical transmission line by said light irradiation section and the light propagating in said optical transmission line to acquire intensity information of the light propagating in said optical transmission line, wherein the light emitted externally from said optical transmission line by the non-linear effect is in a third direction that differs from the first direction and that is at an emitting angle to the light propagating in said optical transmission line, and wherein the emitting angle depends upon characteristics of the light propagating in said optical transmission line and is less than ninety degrees, wherein the light propagating in said optical transmission line has a plurality of wavelengths, and the light emitted externally from said optical transmission line by the non-linear optical effect is emitted in a plurality of directions corresponding to the plurality of wavelengths propagating in said optical transmission line.

6. An optical communication information decoding method for an optical communication apparatus which includes an optical transmission line made of a material having a non-linear optical effect, a light irradiation section, and a light reception section for receiving light emitted externally from said optical transmission line by the non-linear optical effect of said optical transmission line, which comprises:

irradiating light into said optical transmission line by the light irradiation section, wherein light propagating in said optical transmission line is in a first direction and the irradiating light is in a second direction that differs from the first direction and that is at an incident angle to the light propagating in said optical transmission line to cause the non-linear optical effect to occur; and receiving the light emitted externally from said optical transmission line by the non-linear optical effect between the light irradiated into said optical transmission line by said light irradiation section and the light propagating in said optical transmission line by means of said light reception section to decode header information of the information propagating in said optical transmission line, wherein the light emitted externally from said optical transmission line by the non-linear effect is in a third direction that differs from the first direction and that is at an emitting angle to the light propagating in said optical transmission line, and wherein the emitting angle depends upon the characteristics of the light propagating in said optical transmission line and is less than ninety degrees, wherein the light propagating in said optical transmission line has a plurality of wavelengths, and the light emitted externally from said optical transmission line by the nonlinear optical effect has a plurality of wavelengths corresponding to the plurality of wavelengths propagating in said optical transmission line.

7. An optical communication information decoding method according to claim 6, wherein the light emitted externally from said optical transmission line by the non-linear optical effect has a wavelength different from that of the light propagating in said optical transmission line.

8. An optical communication information decoding method according to claim 6, wherein the light irradiated into said optical transmission line by said light irradiation section to cause the non-linear optical effect to occur is a laser beam.

9. An optical communication information decoding method according to claim 6, wherein said light irradiation section includes a resonator in which an optical transmission line made of a material having a non-linear optical effect is disposed.

10. An optical communication information decoding method for an optical communication apparatus which includes an optical transmission line made of a material having a non-linear optical effect, a light irradiation section, and a light reception section for receiving light emitted externally from said optical transmission line by the non-linear optical effect of said optical transmission line, which comprises:

irradiating light into said optical transmission line by the light irradiation section, wherein light propagating in said optical transmission line is in a first direction and the irradiating light is in a second direction that differs from the first direction and that is at an incident angle to the light propagating in said optical transmission line to cause the non-linear optical effect to occur; and receiving the light emitted externally from said optical transmission line by the non-linear optical effect between the light irradiated into said optical transmission line by said light irradiation section and the light propagating in said optical transmission line by means of said light reception section to decode header information of the information propagating in said optical transmission line, wherein the light emitted externally from said optical transmission line by the non-linear effect is in a third direction that differs from the first direction and that is at an emitting angle to the light propagating in said optical transmission line, and wherein the emitting angle depends upon the characteristics of the light propagating in said optical transmission line and is less than ninety degrees, wherein the light propagating in said optical transmission line has a plurality of wavelengths, and the light emitted externally from said optical transmission line by the non-linear optical effect is emitted in a plurality of directions corresponding to the plurality of wavelengths propagating in said optical transmission line.

11. An optical switching system for switching a transmission line in response to information propagating in an optical transmission line, comprising:

an optical switch for performing switching of a transmission line;

an optical transmission line made of a material having a non-linear optical effect and disposed on the upstream side with respect to said optical switch;

a light irradiation section for irradiating light into said optical transmission line, wherein light propagating in said optical transmission line is in a first direction and the irradiating light is in a second direction that differs from the first direction and that is at an incident angle to the light propagating in said optical transmission line to cause the non-linear optical effect to occur;

a light reception section for receiving light emitted externally from said optical transmission line by the non-linear optical effect between the light irradiated into said optical transmission line by said light irradiation section and the light propagating in said optical transmission line to acquire intensity information of the light propagating in said optical transmission line, wherein the light emitted externally from said optical transmission line by the non-linear effect is in a third direction that differs from the first direction and that is at an emitting angle to the light propagating in said optical transmission line, and wherein the emitting angle depends upon the characteristics of the light propagating in said optical transmission line and is less than ninety degrees; and driving means for producing a driving signal for said optical switch from the intensity information acquired by said light reception section, wherein the light propagating in said optical transmission line has a plurality of wavelengths, and the light emitted externally from said optical transmission line by the non-linear optical effect has a plurality of wavelengths corresponding to the plurality of wavelengths propagating in said optical transmission line.

12. An optical switching system according to claim 11, wherein the light emitted externally from said optical transmission line by the non-linear optical effect has a wavelength different from that of the light propagating in said optical transmission line.

13. An optical switching system according to claim 11, wherein the light irradiated into said optical transmission line by said light irradiation section to cause the non-linear optical effect to occur is a laser beam.

14. An optical switching system according to claim 11, wherein said light irradiation section includes a resonator in which an optical transmission line made of a material having a non-linear optical effect is disposed.

15. An optical switching system for switching a transmission line in response to information propagating in an optical transmission line, comprising:
   an optical switch for performing switching of a transmission line;
   an optical transmission line made of a material having a non-linear optical effect and disposed on the upstream side with respect to said optical switch;
   a light irradiation section for irradiating light into said optical transmission line, wherein light propagating in said optical transmission line is in a first direction and the irradiating light is in a second direction that differs from the first direction and that is at an incident angle to the light propagating in said optical transmission line to cause the non-linear optical effect to occur;
   a light reception section for receiving light emitted externally from said optical transmission line by the non-linear optical effect between the light irradiated into said optical transmission line by said light irradiation section and the light propagating in said optical transmission line to acquire intensity information of the light propagating in said optical transmission line, wherein the light emitted externally from said optical transmission line by the non-linear effect is in a third direction that differs from the first direction and that is at an emitting angle to the light propagating in said optical transmission line, and wherein the emitting angle depends upon the characteristics of the light propagating in said optical transmission line and is less than ninety degrees; and
   driving means for producing a driving signal for said optical switch from the intensity information acquired by said light reception section,
   wherein the light propagating in said optical transmission line has a plurality of wavelengths, and the light emitted externally from said optical transmission line by the non-linear optical effect is emitted in a plurality of directions corresponding to the plurality of wavelengths propagating in said optical transmission line.

16. A driving method for an optical switching system for switching a transmission line in response to information propagating in an optical transmission line, comprising the steps of:
   irradiating light from a light irradiation section into an optical transmission line made of a material having a non-linear optical effect and disposed on the upstream side with respect to an optical switch which performs switching of a transmission line, wherein light propagating in said optical transmission line is in a first direction and the irradiating light is in a second direction that differs from the first direction and that is at an incident angle to the light propagating in said optical transmission line to cause the non-linear optical effect to occur;
   receiving light emitted externally from said optical transmission line by the non-linear optical effect between the light irradiated by said light irradiation section and the light propagating in said optical transmission line by means of a light reception section to acquire intensity information of the light propagating in said optical transmission line, wherein the light emitted externally from said optical transmission line by the non-linear effect is in a third direction that differs from the first direction and that is at an emitting angle to the light propagating in said optical transmission line, and wherein the emitting angle depends upon the characteristics of the light propagating in said optical transmission line and is less than ninety degrees; and
   producing a driving signal for said optical switch based on the intensity information,
   wherein the light propagating in said optical transmission line has a plurality of wavelengths, and the light emitted externally from said optical transmission line by the non-linear optical effect has a plurality of wavelengths corresponding to the plurality of wavelengths propagating in said optical transmission line.

17. A driving method for an optical switching system according to claim 16, wherein the light emitted externally from said optical transmission line by the non-linear optical effect has a wavelength different from that of the light propagating in said optical transmission line.

18. A driving method for an optical switching system according to claim 16, wherein the light irradiated into said optical transmission line by said light irradiation section to cause the non-linear optical effect to occur is a laser beam.

19. A driving method for an optical switching system according to claim 16, wherein said light irradiation section includes a resonator in which an optical transmission line made of a material having a non-linear optical effect is disposed.

20. A driving method for an optical switching system for switching a transmission line in response to information propagating in an optical transmission line, comprising the steps of:
   irradiating light from a light irradiation section into an optical transmission line made of a material having a non-linear optical effect and disposed on the upstream side with respect to an optical switch which performs switching of a transmission line, wherein light propagating in said optical transmission line is in a first direction and the irradiating light is in a second direction that differs from the first direction and that is at an incident angle to the light propagating in said optical transmission line to cause the non-linear optical effect to occur;

receiving light emitted externally from said optical transmission line by the non-linear optical effect between the light irradiated by said light irradiation section and the light propagating in said optical transmission line by means of a light reception section to acquire intensity information of the light propagating in said optical transmission line, wherein the light emitted externally from said optical transmission line by the non-linear effect is in a third direction that differs from the first direction and that is at an emitting angle to the light propagating in said optical transmission line, and wherein the emitting angle depends upon the characteristics of the light propagating in said optical transmission line and is less than ninety degrees; and producing a driving signal for said optical switch based on the intensity information, wherein the light propagating in said optical transmission line has a plurality of wavelengths, and the light emitted externally from said optical transmission line by the non-linear optical effect is emitted in a plurality of directions corresponding to the plurality of wavelengths propagating in said optical transmission line.

* * * * *